(12) United States Patent
Oshetski et al.

(10) Patent No.: US 11,984,008 B2
(45) Date of Patent: May 14, 2024

(54) DEVICE AND METHOD FOR MONITORING SAFETY CABLES

(71) Applicant: MICATU INC., Horseheads, NY (US)

(72) Inventors: Michael Oshetski, Horseheads, NY (US); James Kennedy, Corning, NY (US); William Laratta, Paris (FR); Atul Pradhan, Pittsford, NY (US)

(73) Assignee: MICATU INC., Horseheads, NY (US)

( * ) Notice: Subject to any disclaimer, the term of this patent is extended or adjusted under 35 U.S.C. 154(b) by 485 days.

(21) Appl. No.: 17/256,822

(22) PCT Filed: Jul. 1, 2019

(86) PCT No.: PCT/US2019/040158
§ 371 (c)(1),
(2) Date: Dec. 29, 2020

(87) PCT Pub. No.: WO2020/010005
PCT Pub. Date: Jan. 9, 2020

(65) Prior Publication Data
US 2021/0285814 A1  Sep. 16, 2021

Related U.S. Application Data

(60) Provisional application No. 62/692,956, filed on Jul. 2, 2018.

(51) Int. Cl.
*G08B 21/04* (2006.01)
*G01H 1/06* (2006.01)
(Continued)

(52) U.S. Cl.
CPC ............. *G08B 21/043* (2013.01); *G01H 1/06* (2013.01); *G01H 1/08* (2013.01); *G01H 11/08* (2013.01)

(58) Field of Classification Search
CPC . G01H 1/06; G01H 1/08; G01H 11/08; G01H 1/04; G08B 21/043; A62B 35/0093; A62B 35/0043; A62B 99/00
See application file for complete search history.

(56) References Cited

U.S. PATENT DOCUMENTS

2009/0096603 A1   4/2009 Langsweirdt et al.
2009/0292227 A1*  11/2009 Scholten .............. A61B 5/0031
                                                  600/595
(Continued)

FOREIGN PATENT DOCUMENTS

CN    207019638 U      2/2018
CN    207263227 U   *  4/2018
(Continued)

OTHER PUBLICATIONS

International Search Report and Written Opinion for PCT/US2019/040158, dated Sep. 17, 2019.

*Primary Examiner* — Steven L Yeninas
*Assistant Examiner* — Dilara Sultana
(74) *Attorney, Agent, or Firm* — Troutman Pepper Hamilton Sanders LLP

(57) ABSTRACT

One aspect of the present technology relates to a safety cable vibration monitoring system. The system includes a vibration sensor configured to be coupled to a safety cable. A vibration monitoring computing device is coupled to the vibration sensor. The vibration monitoring computing device includes a processor and a memory coupled to the processor which is configured to execute one or more programmed instructions comprising and stored in the memory to receive data from the vibration sensor. An occurrence of a fall event related to use of the safety cable is determined based on the received data from the vibration (Continued)

sensor. A method of monitoring a safety cable and a safety cable monitoring network are also disclosed.

20 Claims, 6 Drawing Sheets

(51) Int. Cl.
  *G01H 1/08* (2006.01)
  *G01H 11/08* (2006.01)

(56) References Cited

U.S. PATENT DOCUMENTS

| | | | | |
|---|---|---|---|---|
| 2010/0231402 | A1* | 9/2010 | Flynt | G08B 19/00 |
| | | | | 340/679 |
| 2011/0084157 | A1* | 4/2011 | Meillet | A62B 35/0093 |
| | | | | 242/382.1 |
| 2015/0014092 | A1* | 1/2015 | Blaise | A62B 35/0081 |
| | | | | 182/5 |
| 2015/0355216 | A1* | 12/2015 | Girardeau | G01H 11/08 |
| | | | | 73/514.29 |
| 2016/0199678 | A1* | 7/2016 | Tsai | C08G 18/6674 |
| | | | | 248/636 |
| 2018/0120265 | A1* | 5/2018 | Yoskovitz | G01N 29/46 |

FOREIGN PATENT DOCUMENTS

| | | | | |
|---|---|---|---|---|
| EP | 2606939 A2 * | 6/2013 | | A62B 35/0043 |
| WO | 2004100092 A2 | 11/2004 | | |

\* cited by examiner

DEVICE AND METHOD FOR MONITORING SAFETY CABLES

This application is a national stage application under 35 U.S.C. § 371 of PCT Application No. PCT/US2019/040158, filed Jul. 1, 2019, which claims benefit of U.S. Provisional Patent Application Ser. No. 62/692,956, filed Jul. 2, 2018, which are hereby incorporated by reference in their entirety.

FIELD

The present invention relates devices and methods for the detection and analysis of vibration and shock. More specifically, the invention relates to devices and methods for the detection and analysis of vibration and shock on cables, such as structural cables, safety cables, life-lines, and support cables among others. The present invention also relates to devices and methods for monitoring safety cables.

BACKGROUND

Towers play an important role in many industries such as radio broadcast, cellular phone, oil and gas, chemical, and wind, for example. Installation and maintenance of the towers requires personnel to climb the towers on a relatively frequent basis. According to the U.S. Occupations Safety and Health Administration (OSHA), tower climbing is one of the most dangerous jobs in the United States, with falls being a leading cause of death. Most tower climbing deaths are due to human error. In order to minimize fatal falls, a number of safety measures are employed by those working at heights above 24 feet off the ground. One key safety measure is the use of vertical and horizontal life-lines and safety cables.

Full-body harnesses are used by most climb professionals as a measure to prevent falls. Lanyards are used by the climbers to attach themselves to towers while performing work. One end of the lanyard is attached to the climber's harness, and the other end is attached to a support structure on the tower.

For climbing up and down towers, safety cables or life lines are employed. These are typically steel cables that run from the base of the tower to the top, usually parallel to a built-in ladder or similar climbing device. Various fall arrest systems are required depending on the situation where falls are possible. Typically, fall prevention systems must be employed where there is a potential fall of 4 to 6 feet. However, when a ladder is involved, such as in tower climbing situations, fall arrest devices are required if the ladder reaches 24 feet or higher off the ground. In such cases, safety cables that run the length of the ladder must be employed, and workers climbing the ladder must attach fall arrest devices, such as cable-grabs, to the safety cable.

The climber will have a fall-arrest device, such as a cable-grab, attached via a carabiner to their harness. The free, or grab-end of the cable-grab is clamped onto the cable. As the climber moves up or down the cable at normal climb or descend speeds, the cable-grab slides freely along the cable. However, if the climber falls, the cable-grab is triggered to catch onto the cable upon rapid descent.

When a fall occurs, and the cable-grab deploys on the safety cable, it causes great stress to the cable and supporting structures (e.g., cable support brackets). These structures can be weakened or fatigued, such that they could fail in the event of subsequent falls. For this reason, regulations require that falls be reported and that the owner of the tower replace all components of the safety cable system, including the cable and the top and bottom cable support brackets, after a fall incident occurs.

Typically, a fall triggers the illumination of a light at the top of the tower, indicating that the cable may be damaged. However, many towers are over 200 feet tall. Thus, an illuminated light at the top is not easily visible. Also, many falls are simply not reported. Therefore, there is a potential that damaged cables may not be replaced, which puts the safety of subsequent climbers at risk. Thus, there is a need for a system that provides improved monitoring of safety cables or life-lines for vibration and shock.

The present invention is directed to overcoming these and other deficiencies in the art.

SUMMARY

One aspect of the present technology relates to a safety cable vibration monitoring system. The system includes a vibration sensor configured to be coupled to a safety cable. A vibration monitoring computing device is coupled to the vibration sensor. The vibration monitoring computing device includes a processor and a memory coupled to the processor which is configured to execute one or more programmed instructions comprising and stored in the memory to receive data from the vibration sensor. The received data is processed to determine an occurrence of a fall event related to use of the safety cable.

Another aspect of the present technology relates to a method of monitoring a safety cable using the disclosed safety cable vibration monitoring system. The safety cable vibration monitoring system is provided. The vibration sensor device is coupled to the safety cable. The vibration monitoring computing device receives data from the vibration sensor. The vibration monitoring computing device processes the received data to determine an occurrence of a fall event related to use of the safety cable.

A further aspect of the present technology relates to a safety cable monitoring network. The network includes a plurality of the disclosed vibration sensing devices. A central server is coupled to each of the vibration monitoring computing devices via one or more communication networks. The central server receives and stores data related to determined fall events.

The present technology allows tension and vibration on safety cables to be constantly monitored. The technology is able to track when someone has climbed, or is climbing a tower, and more importantly provide a real-time signal when a fall occurs. This ensures that organizations charged with ensuring the safety of people climbing towers are aware of each climb that occurs, of each fall that occurs, and when a fall has been severe enough to warrant replacement of the safety cable. In addition to simply reporting that a fall has occurred, the system also enables evaluation of the impact of a fall on a cable. Thus, rather than changing the cable and support structures after a fall occurs, there may be an opportunity to determine whether a fall caused sufficient stress, force, or impulse, to the cable to warrant a replacement.

Advantages of the present device include providing simple, low cost devices and methods for monitoring vibration and shock on cables, particularly, but not limited to, safety-cables used for working on towers, construction sites (e.g., scaffolding), refineries, manufacturing facilities, etc. The devices and methods of the present technology can be readily employed in many situations including radio transmission towers, mobile phone towers, wind turbine towers, oil and gas rigs, and electrical utility towers and poles, by way of example only.

Furthermore, the present technology enables real-time monitoring of cables. Typically, a written record is kept of tower climb events, including the date and time of the climb and any incidents, such as falls, that may occur. The present invention allows these events to be recorded automatically, and data from such events can be sent to a central location. Additionally, the system can track other events, such as weather events, or impacts with airborne materials, that could impact performance of safety cables.

The present invention also provides for detection and communication of fall events to a central location, ensuring replacement of damaged cables occurs prior to subsequent climbs.

DETAILED DESCRIPTION

The present invention relates devices and methods for the detection and analysis of vibration and shock. More specifically, the invention relates to devices and methods for the detection and analysis of vibration and shock on cables, such as structural cables, safety cables, life-lines, and support cables among others. The present invention also relates to devices and methods for monitoring safety cables.

One aspect of the present technology relates to a safety cable vibration monitoring system. The system includes a vibration sensor configured to be coupled to a safety cable. A vibration monitoring computing device is coupled to the vibration sensor. The vibration monitoring computing device includes a processor and a memory coupled to the processor which is configured to execute one or more programmed instructions comprising and stored in the memory to receive data from the vibration sensor. An occurrence of a fall event related to use of the safety cable based on the received data from the vibration sensor.

Figure 1:
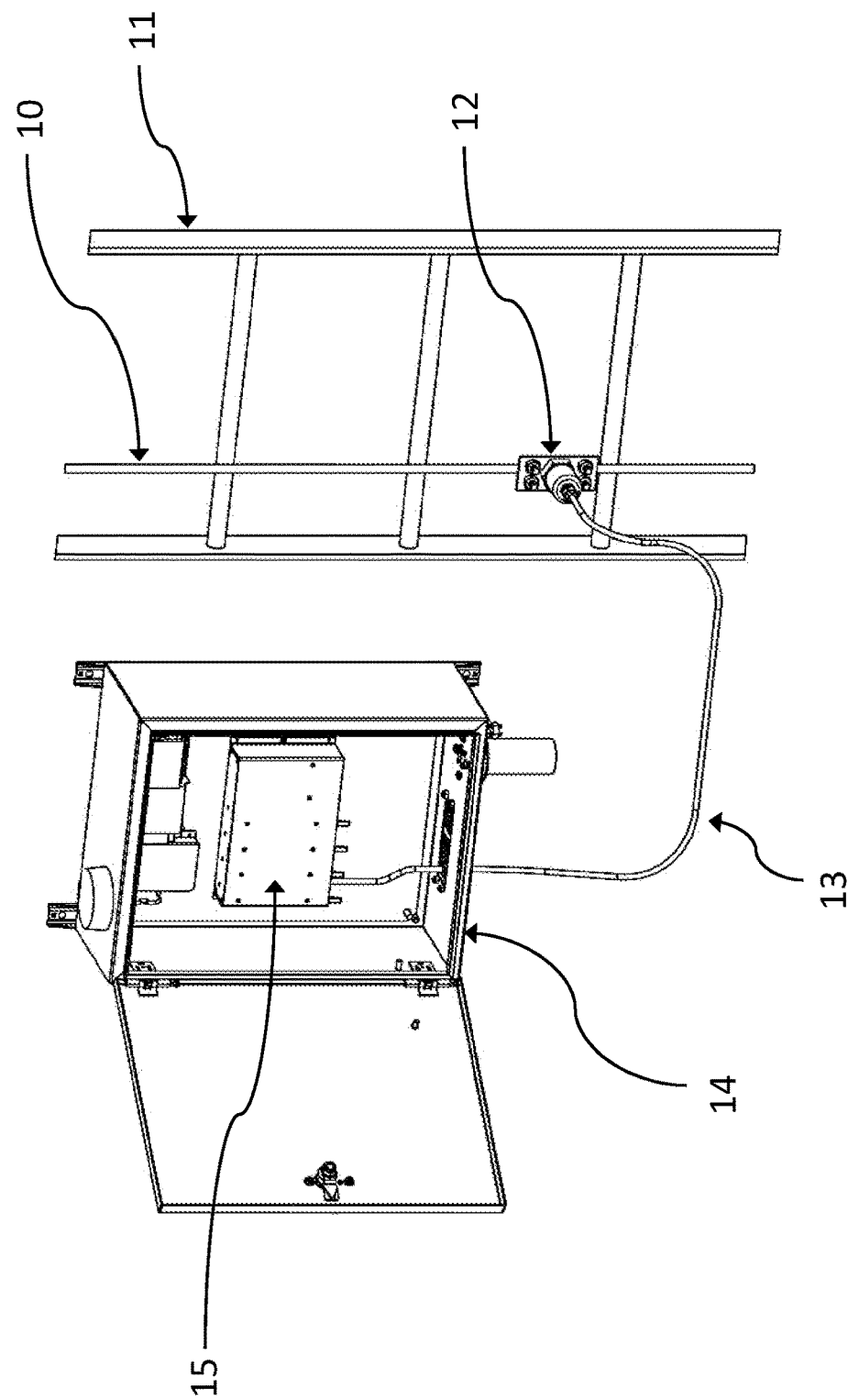
FIG. 1 shows an environment including an exemplary safety cable vibration monitoring system of the present technology.

FIG. 1 shows an embodiment of cable vibration monitoring system 5 that includes vibration sensor device 12 and vibration monitoring computing device 15, although cable vibration system 5 may include other types and/or numbers of elements or devices in other combinations. Cable vibration monitoring system 5 provides for monitoring vibration and tension on a cable, such as a safety cable, by way of example, although cable vibration monitoring system 5 may be utilized to monitor other types of cables or tension wires.

In particular, the present technology relates to a system and method for monitoring vibration on safety cables or lifelines.

Referring again to FIG. 1, vibration sensor device 12 is coupled to safety cable 10 running parallel to ladder 11, although the vibration sensor 12 may be used in other arrangements for use with cables on other structures such as buildings or towers. Safety cable 10 in this example is a steel cable, although safety cable may be comprised of various materials, and can include rope-like cables, metal cables, nylon cables, combinations thereof, or cables made of any material known in the art.

Vibration sensor device 12 may be coupled to safety cable 10 at any location along safety cable 10. In one example, vibration sensor device 12 is coupled to safety cable 10 at a location where vibration sensor device 12 does not interfere with movement of a cable-grab along safety cable 10. Vibration sensor device 12 may include a piezoelectric vibration sensor, a piezoelectric accelerometer, or an optical vibration sensor, by way of example only, although other sensors configured to measure vibrations may also be employed.

In this example, connecting cable 13 couples vibration sensor device 12 to vibration monitoring computing device 15 and allows signals from vibration sensor device 12 to be transferred to vibration monitoring computing device 15, although in other examples a wireless connection between the vibration sensor device 12 and the vibration monitoring computing device 15 may be employed such that vibration monitoring computing device 15 may be located remotely from vibration sensor device 12. Depending on the type of sensor used for vibration sensor device 12, connecting cable 13 can be an electrical conductive cable carrying electrical signals where vibration sensor device 12 is an electrical sensor, or a fiber optical cable carrying digital light pulses where vibration sensor device 12 is an optics based sensor. In this example, connecting cable 13 is inserted into enclosure 14 that houses vibration monitoring computing device 15. Vibration monitoring computing device 15 is enclosed within enclosure 14, which may be any enclosure suitable to provide protection from the environment for vibration monitoring computing device 15. In one example, enclosure 14 is a NEMA rated enclosure, although other types of enclosures may be utilized.

Figure 2:
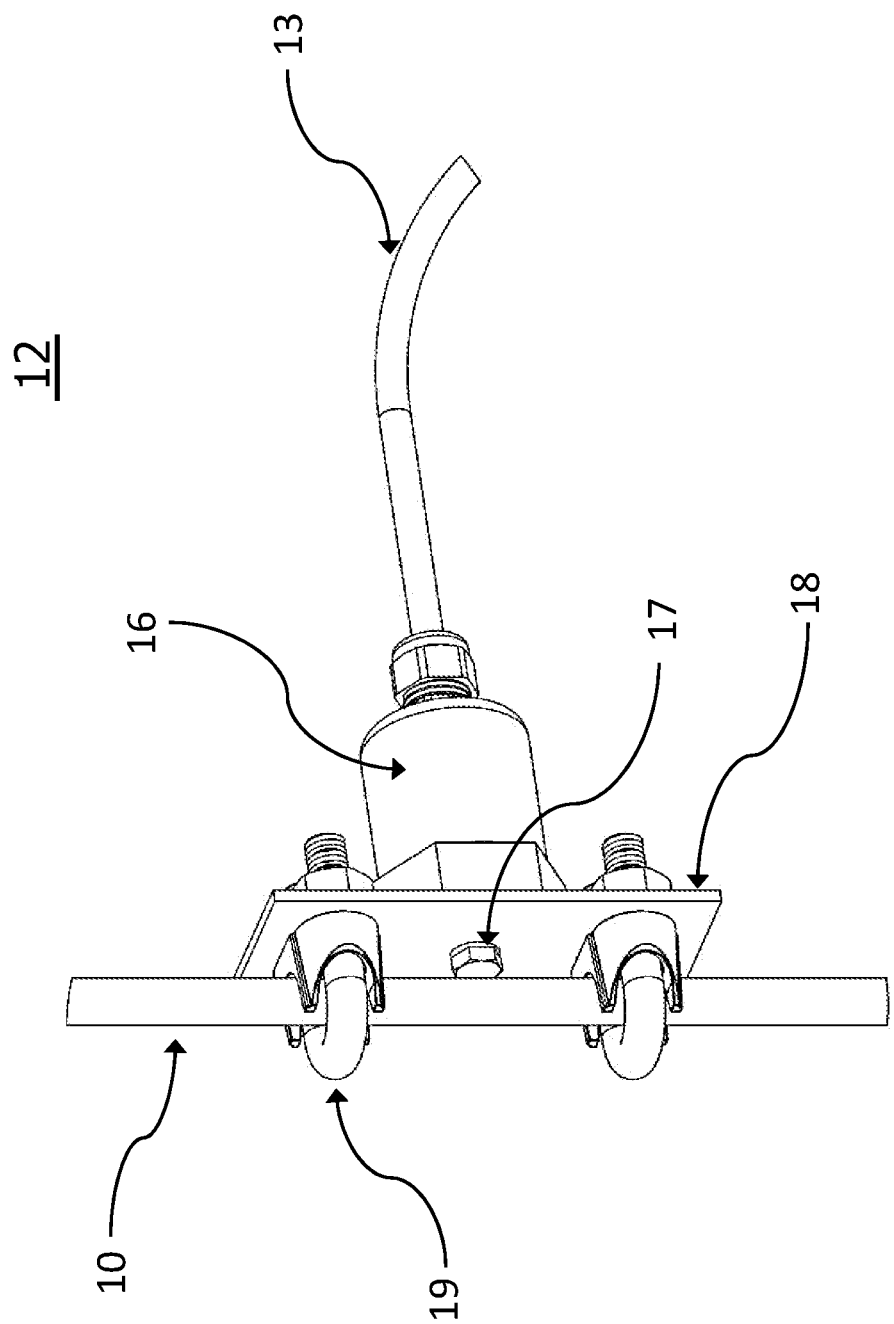
FIG. 2 is a perspective view of the vibration sensing apparatus of FIG. 1 coupled to a safety cable.

FIG. 2 shows an exemplary coupling of vibration sensor device 12 to safety cable 10, although other methods and devices known in the art for coupling the vibration sensor 12 to safety cable 10 can be utilized. In another example, vibration sensor device 12 may coupled directly to a cable support structure that is used to hold safety cable 10 in place on the tower.

Referring again to FIG. 2, in this example, vibration sensor device 12 includes a vibration sensor portion 16 attached via bolt 17 to plate 18. Plate 18 is coupled to safety cable 10 by one or more metal U-clamps 19, although plate 18 may be cabled to safety cable 10 using other types and/or number of clamps. Vibration sensor portion 16 of vibration sensor device 12 can be any type of vibration sensor known in the art, including piezoelectric vibration sensors, piezoelectric accelerometers, or optical vibration sensors. Examples of piezoelectric accelerometers include the CMCP786A General Purpose Accelerometer made by STI Vibration Monitoring, Inc., League City, TX or the ACC786A OMEGAROMETER Series Accelerometer made by Omega Engineering, Inc., Norwalk, CT. Examples of optical vibration sensors include the PHOVIS sensor made by Micatu, Inc., Horseheads, NY and the OA-1 sensor made by CEKO Sensors ApS, Denmark.

Plate 18 is used to couple vibration sensor device 12 to safety cable 10 and is formed of a rigid material such as a metal or any material in the art with tensile properties similar to that of metal. Suitable metals that may be utilized for plate 18 include steel, iron, copper, and bronze, by way of example only, although other metals may be employed. In some examples, plate 18 may be comprised of a carbon composite, or similar materials, as long as said materials have properties, including tensile properties, similar to those of metal. Plate 18 is configured such that vibrations that impact safety cable 10 are transferred to vibration sensor portion 16 of vibration sensor device 12.

Figure 3:
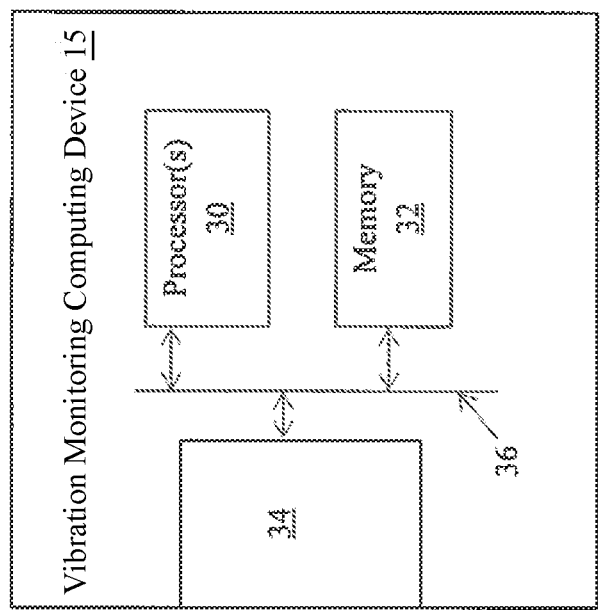
FIG. 3 is a block diagram of an exemplary vibration monitoring computing device of the present technology.

Referring now to FIG. 3 vibration monitoring computing device 15 includes one or more processor(s) 30, memory 32, and communication interface 34, which are coupled together by bus 36 or other communication link, although vibration monitoring computing device 15 can include other types and/or numbers of elements in other configurations. In one example, vibration monitoring computing device 15 is a microcontroller located on a printed circuit board. Other elements including additional electronics, such as analog to digital converters, by way of example only, may be associated with vibration monitoring computing device 15.

Processor(s) 30 of vibration monitoring computing device 15 may execute programmed instructions stored in memory 32 for the any number of the functions described and illustrated herein. In one example, processor(s) 30 receives data from vibration sensor device 12, and processes the data to determine vibrations impacting safety cable 10. The processor(s) 30 may include one or more CPUs, GPUs, or general purpose processors with one or more processing cores, for example, although other types of processor(s) can also be used.

Memory 32 stores these programmed instructions for one or more aspects of the present technology as described and illustrated herein, although some or all of the programmed instructions could be stored elsewhere. A variety of different types of memory storage devices, such as random-access memory (RAM), read only memory (ROM), hard disk, solid state drives, flash memory, or other computer readable medium which is read from and written to by a magnetic, optical, or other reading and writing system that is coupled to the processor(s), can be used for memory 32.

Figure 4:
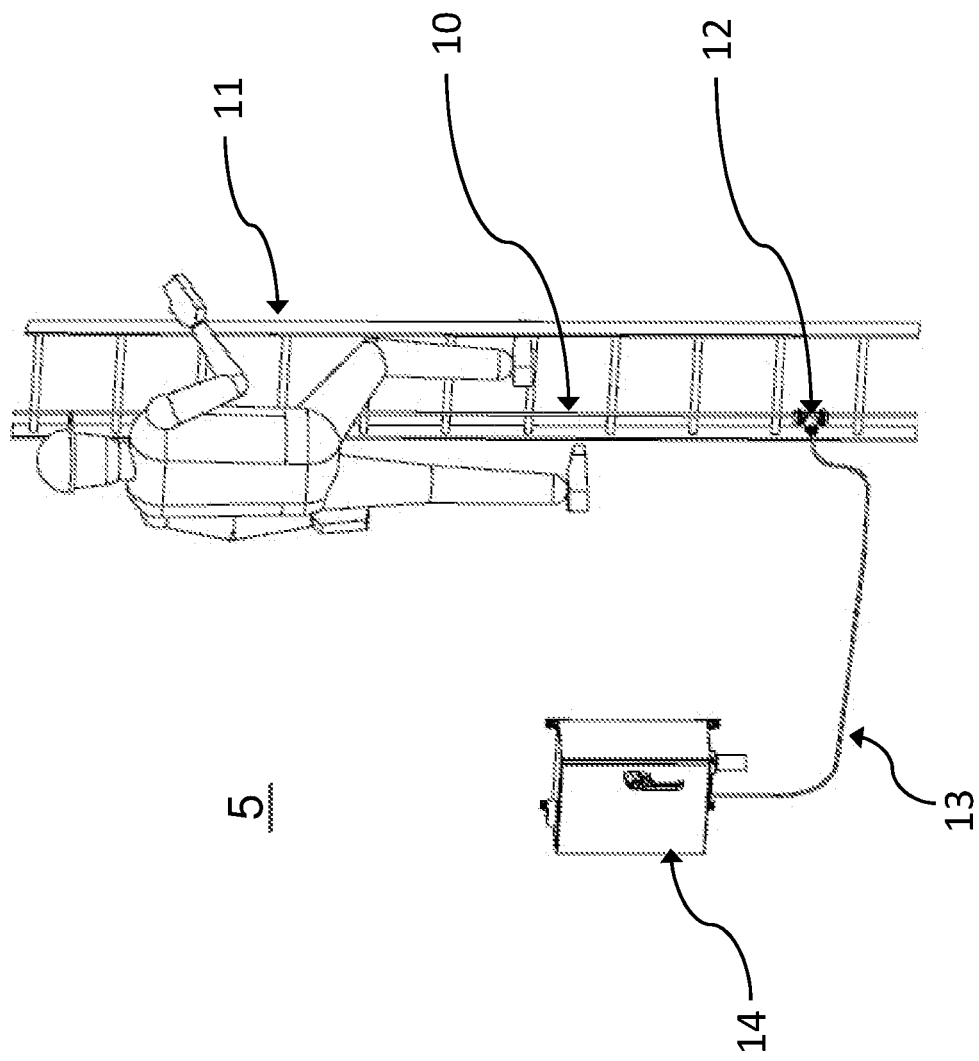
FIG. 4 illustrates the safety cable vibration monitoring system of the present technology during use for a tower climb.

Accordingly, memory 32 of vibration monitoring computing device 15 can store one or more applications or programs that can include computer executable instructions that, when executed by one or more processors 30 of vibration monitoring computing device 15, cause the vibration monitoring computing device 15 to perform actions described and illustrated below with reference to FIGS. 4 and 6. The application(s) can be implemented as modules, threads, pipes, streams, or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s) may be running in one or more virtual machines (VMs) executing on vibration monitoring computing device 15.

Communication interface 34 operatively couples and communicates between vibration monitoring computing device 15 and vibration sensor device 12. In another example, vibration monitoring computing device 15 is a highly integrated microcontroller device with a variety of on-board hardware functions, such as analog to digital converters, digital to analog converters, serial buses, general purpose I/O pins, RAM, and ROM. The microcontroller may be located on a printed circuit board, by way of example.

Although exemplary vibration monitoring computing device 15 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for vibration monitoring computing device 15. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Another aspect of the present technology relates to a method of monitoring a safety cable using the disclosed safety cable vibration monitoring system. The safety cable vibration monitoring system is provided. The vibration sensor device is coupled to the safety cable. The vibration monitoring computing device receives data from the vibration sensor. An occurrence of a fall event related to use of the safety cable is determined by the vibration monitoring computing device based on the received data from the vibration sensor.

An exemplary operation of vibration monitoring system 5 will now be described. FIG. 4 shows vibration monitoring system 5 of the present technology deployed on safety cable 10 associated with ladder 11 during a climb, although vibration monitoring system 5 may be utilized on other types and/or numbers of cables as well as other structures. A worker is shown climbing ladder 11 with associated safety cable 10. Vibration sensor device 12 is coupled to the bottom of the safety cable 10, such that vibration sensor device 12 does not interfere with movement of a cable-grab utilized by the worker on safety cable 10 during the climb up ladder 11. Vibration sensor device 12 is connected to vibration monitoring computing device 15, which is located within sealed enclosure 14. In this example, vibration sensor device 12 is connected to vibration monitoring computing device 15 by cable 13, such as an electrical or fiber optic cable, although other connections, such as wireless connections by way of example, may be employed.

By way of example, in the event of a worker fall, a cable-grab device (not shown) utilized by the worker, which is connected to the worker's harness and safety cable 10, will grab onto the safety cable 10 to break the worker's fall. The process of the cable-grab grabbing or securing onto safety cable 10 to stop the fall can place great stress onto the cable and imparts an impulse and associated force causing a vibration, which can be detected by vibration sensor portion 16 of vibration sensor device 12, as shown in FIG. 2, although vibration sensor portion 16 can sense other vibrations that impact safety cable 10, such as vibrations due to weather or other impacts by way of example.

Vibration data from vibration sensor portion 16 of vibration sensor device 12 is sent to vibration monitoring computing device 15, where it is processed via algorithms to sense a fall event, although vibration monitoring computing device may be configured to sense other impacts on safety cable 10, such as wind, climbs, or impact by flying matter that may also trigger vibrations on safety cable 10 and may be sensed by vibration sensor portion 16 of vibration sensor device 12. These impacts may also be monitored and logged by vibration monitoring computing device 15. Algorithms programmed and stored in the memory of vibration monitoring computing device 15 can discern various types of vibration and shock, allowing the system to differentiate fall events from other impacts related to non-fall events.

In one example, determining the occurrence of the fall event related to use of safety cable 10 includes determining a set of vibrations imparted on safety cable 10 from vibration data sent to vibration computing device 15 from vibration sensor device 12. The set of vibrations may include at least one vibration having an amplitude above an amplitude threshold value and a frequency below a first frequency threshold, and at least one transient vibration having a frequency above a second frequency threshold. In one example, the amplitude threshold is at least 1 g, the first frequency threshold is 50 Hz, and the second frequency threshold is 200 Hz, although other metrics may be employed to determine the occurrence of other impacts on safety cable 10.

Figure 5:
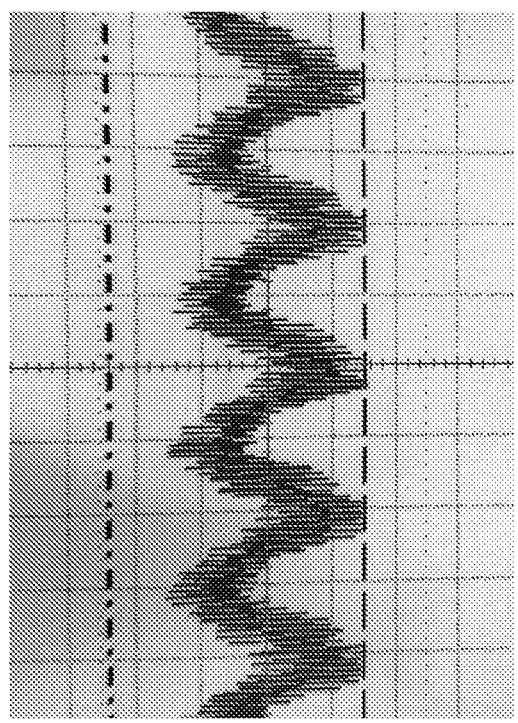
FIG. 5 shows exemplary data from a vibration monitoring system including an analog oscillograph recording of low frequency, high amplitude cable wave oscillation immediately following a transient 1 g fall event.

FIG. 5 shows an analog oscillograph recording of a low frequency, high amplitude cable wave oscillation immediately following a transient 1 g fall event. A falling event will be characterized by an arresting, or braking impulse generating a unique time and wave signature. The typical mass of a person is 50-100 kg, and over a fall distance of 10 meters, this will result in an impulse associated with 500-1000 newtons of force. As an example, a typical stopping distance of 40-50 mm indicates an arresting impulse time of 4-5 milliseconds. This will result in a transient frequency signature of 200-250 Hz. Just as importantly however, is the fact that given the long length, and tensioning of safety cable 10, low frequency, high amplitude, oscillations and waves, such as at approximately 10-20 Hz, will also be generated for an extended duration of time after a fall event. FIG. 5 illustrates a periodic envelope of approximately 10 Hz over a 50 milli-second division timescale with transient oscillations superposed at greater than 200 Hz. For reference, the ordinate is 5 Volts per division. The oscillations shown in FIG. 5 may be utilized to determine a fall event, although other incidents may be measured and determined using the present technology.

Next, vibration monitoring computing device 15 provides an alert upon determining an event, such as a fall event, has occurred. The alert may be any type of notification known in the art, such as electronic alerts, visual alerts, and/or audible alerts.

A further aspect of the present technology relates to a safety cable monitoring network. The network includes a plurality of the disclosed vibration sensing devices. A central server is coupled to each of the vibration monitoring computing devices via one or more communication networks. The central server receives and stores data related to determined fall events.

Figure 6:
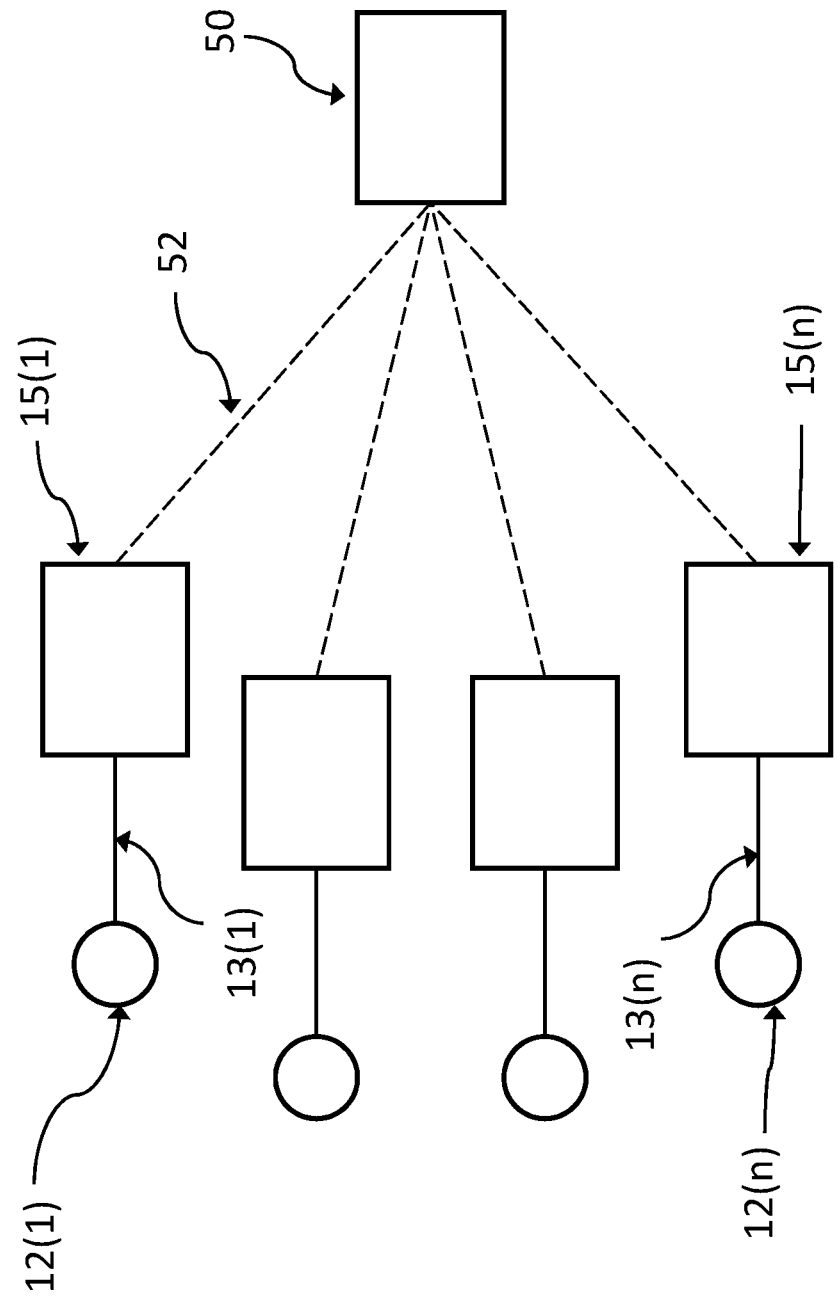
FIG. 6 is a block diagram of the integration of multiple safety cable vibration monitoring systems with a central hub to form a network of safety cable monitoring systems.

FIG. 6 shows environment 100 including plurality of vibration monitoring devices 12(1)-12(n) for monitoring multiple safety cables (not shown) in multiple locations by a central server 50. In this example, plurality of vibration sensor devices 12(1)-12(n) are connected to vibration monitoring computing devices 15(1)-15(n) by connecting cables 13(1)-13(n), respectively, although in other examples, a plurality of vibration sensor devices may be coupled to single vibration computing device.

Vibration monitoring computing devices 15(1)-15(n) of each vibration monitoring system each send intermittent or real-time signals to central server 50 over one or more communication networks 52. The signals can be transmitted by any method known in the art using known communication networks. Examples of communication networks 52 include transmission by conductive cable, by fiber optic cables, by radio signals such as WiFi, or by cellular communication or by satellite. Non-limiting examples of cellular communication include CDMA 2 G, 3 G, 4 G, 5 G, LTE, and any cellular communications developed in the future. Together the one or more vibration monitoring systems will transmit data to one central server 50, forming a cable vibration monitoring network. Central server 50 receives and stores data related to determined fall events, as well as other vibration incidents impacting the monitored safety cables.

Advantages of the present device include providing a simple, low cost way of monitoring vibration and shock on cables, particularly, but not limited to safety-cables used for working on towers, at construction sites (e.g., scaffolding), at refineries, at manufacturing facilities, etc. The devices and methods of the present technology can be readily deployed in many locations having towers, including radio transmission towers, mobile phone towers, wind turbine towers, oil and gas rigs, electrical utility towers and poles, among others. Furthermore, the present technology enables real-time monitoring of cables. Typically, a written record is kept of tower climb events, including the date and time of the climb and any incidents, such as falls, that may occur. The present technology allows these events to be recorded automatically, and data from such events can be sent to a central location. Additionally, the present technology can track other events, such as weather events, or impacts with airborne materials, that could impact performance of safety cables.

In some embodiments, the present invention can be used to monitor safety-cables onsite, whereas in other embodiments it may be used to send safety-cable monitoring information to a central hub or location. In this latter instance, the central hub may serve as a cable monitoring center, receiving data or information from multiple towers in a geographic region, within a country, or globally.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A safety cable vibration monitoring system, comprising:
   a vibration sensor configured to be coupled to a safety cable; and
   a vibration monitoring computing device communicably coupled to the vibration sensor, the vibration monitoring computing device comprising a processor and a memory coupled to the processor and comprising instructions stored thereon, wherein the processor is configured to execute the stored instructions to:
     receive data from the vibration sensor indicative of a set of vibrations imparted on the safety cable by a cable-grab device coupled to a climber harness and moveable unimpeded by the vibration sensor along a length of a portion of the safety cable; and
     characterize a time and oscillating wave signature of the set of vibrations to determine an occurrence of a fall event related to use of the safety cable based on the received data from the vibration sensor, wherein the vibration monitoring computing device is located remotely from the vibration sensor.

2. The safety cable vibration monitoring system of claim 1, wherein the vibration sensor comprises a piezoelectric vibration sensor, a piezoelectric accelerometer, or an optical vibration sensor.

3. The safety cable vibration monitoring system of claim 1, wherein the vibration sensor is coupled to the safety cable using an attachment device comprising:
   a plate configured to be coupled to the vibration sensor; and
   at least one u-clamp extending from the plate and configured to couple the plate to the safety cable.

4. The safety cable vibration monitoring system of claim 1, wherein the vibration sensor is not coupled to the climber harness and the processor is further configured to execute the stored instructions to analyze the received data to determine a force imparted on the safety cable by a securing onto the safety cable of the cable-grab device as a result of the occurrence of the fall event.

5. The safety cable vibration monitoring system of claim 4, wherein the vibration monitoring computing device is located in an enclosure.

6. The safety cable vibration monitoring system of claim 5, wherein the enclosure is a National Electrical Manufacturer Association (NEMA) rated electrical enclosure.

7. The safety cable vibration monitoring system of claim 1, wherein the set of vibrations comprises:
   at least one vibration having an amplitude above an amplitude threshold value and a frequency below a first frequency threshold; and
   at least one transient vibration having a frequency above a second frequency threshold.

8. The safety cable vibration monitoring system of claim 7, wherein the amplitude threshold is at least 1 g, the first frequency threshold is 50 Hz, and the second frequency threshold is 200 Hz.

9. The safety cable vibration monitoring system of claim 1, wherein the processor is further configured to execute the stored instructions to provide a notification related to the occurrence of the fall event.

10. A safety cable monitoring network, comprising:
    a plurality of the safety cable vibration monitoring systems of claim 1; and
    a central server coupled to each of the vibration monitoring computing devices via one or more communication networks, wherein the central server receives and stores data related to determined fall events.

11. A method of monitoring a safety cable, the method comprising:
    coupling a vibration sensor to a safety cable;
    communicably coupling the vibration sensor to a vibration monitoring computing device located remotely from the vibration sensor;
    receiving, by the vibration monitoring computing device, data from the vibration sensor indicative of a set of vibrations imparted on the safety cable by a cable-grab device coupled to a climber harness and moveable unimpeded by the vibration sensor along a length of a portion of the safety cable; and
    characterizing, by vibration monitoring computing device, a time and oscillating wave signature of the set of vibrations to determine an occurrence of a fall event related to use of the safety cable based on the received data from the vibration sensor.

12. The method of claim 11, wherein the vibration sensor comprises a piezoelectric vibration sensor, a piezoelectric accelerometer, or an optical vibration sensor.

13. The method of claim 11, further comprising coupling the vibration sensor to the safety cable using an attachment device comprising:
    a plate configured to be coupled to the vibration sensor device; and
    at least one u-clamp extending from the plate and configured to couple the plate to the safety cable.

14. The method of claim 11, wherein the vibration sensor is not coupled to the climber harness and the method further comprises analyzing, by the vibration monitoring computing device, the received data to determine a force imparted on the safety cable by a securing onto the safety cable of the cable-grab device as a result of the occurrence of the fall event.

15. The method of claim 14, wherein the vibration monitoring computing device is located in an enclosure.

16. The method of claim 11, further comprising determining a set of vibrations imparted on the safety cable, wherein the set of vibrations comprises:
    at least one vibration having an amplitude above an amplitude threshold value and a frequency below a first frequency threshold; and
    at least one transient vibration having a frequency above a second frequency threshold.

17. The method of claim 16, wherein the amplitude threshold is at least 1 g, the first frequency threshold is 50 Hz, and the second frequency threshold is 200 Hz.

18. The method of claim 11, further comprising providing, by the vibration monitoring computing device, a notification related to the occurrence of the fall event.

19. A vibration monitoring computing device, comprising:
    a memory comprising instructions stored thereon; and
    a processor coupled to the memory and configured to execute the stored instructions to:
      receive data from a vibration sensor indicative of a set of vibrations imparted on a safety cable to which the vibration sensor is coupled, wherein the set of vibrations is imparted on the safety cable by a cable-grab device coupled to a climber harness and moveable unimpeded by the vibration sensor along a length of a portion of the safety cable; and characterize a time and oscillating wave signature of the set of vibrations to determine an occurrence of a fall event related to use of the safety cable based on the received data, wherein the vibration monitoring computing device is located remotely from the vibration sensor.

20. The vibration monitoring computing device of claim 19, wherein the vibration sensor is not coupled to the climber harness and the processor is further configured to execute the stored instructions to analyze the received data to determine a force imparted on the safety cable by a securing onto the safety cable of the cable-grab device as a result of the occurrence of the fall event.

* * * * *